(12) United States Patent
Tinker et al.

(10) Patent No.: US 10,146,506 B2
(45) Date of Patent: Dec. 4, 2018

(54) EFFICIENT IMPLEMENTATION OF A MULTIPLIER/ACCUMULATOR WITH LOAD

(71) Applicant: TEXAS INSTRUMENTS INCORPORATED, Dallas, TX (US)

(72) Inventors: Darrell E. Tinker, Austin, TX (US); Keerthinarayan Heragu, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 39 days.

(21) Appl. No.: 14/938,046

(22) Filed: Nov. 11, 2015

(65) Prior Publication Data

US 2016/0132295 A1 May 12, 2016

Related U.S. Application Data

(60) Provisional application No. 62/078,166, filed on Nov. 11, 2014.

(51) Int. Cl.
 *G06F 7/544* (2006.01)
(52) U.S. Cl.
 CPC .................... *G06F 7/5443* (2013.01)
(58) Field of Classification Search
 CPC .................... G06F 7/5443; G06F 7/57
 See application file for complete search history.

(56) References Cited

U.S. PATENT DOCUMENTS

| 5,572,535 | A | * | 11/1996 | Pixley | ............... | G01R 31/3181 714/21 |
| 5,796,644 | A | * | 8/1998 | Jiang | ....................... | G06F 7/485 708/205 |
| 2002/0116432 | A1 | * | 8/2002 | Strjbaek | ............... | G06F 7/5443 708/523 |
| 2005/0144215 | A1 | * | 6/2005 | Simkins | ............... | G06F 7/5443 708/620 |

* cited by examiner

*Primary Examiner* — Chuong D Ngo
(74) *Attorney, Agent, or Firm* — Kenneth Liu; Charles A. Brill; Frank D. Cimino

(57) ABSTRACT

This invention is multiply-accumulate circuit supporting a load of the accumulator. During multiply-accumulate operation a partial product generator forms partial produces from the product inputs. An adder tree sums the partial product and the accumulator value. The sum is stored back in the accumulator overwriting the prior value. During load operation an input gate forces one of the product inputs to all 0's. Thus the partial product generator generates partial products corresponding to a zero product. The adder tree adds this zero product to the external load value. The sum, which corresponds to the external load value is stored back in the accumulator overwriting the prior value. A multiplexer at the side input of the adder tree selects the accumulator value for normal operation or the external load value for load operation.

13 Claims, 1 Drawing Sheet

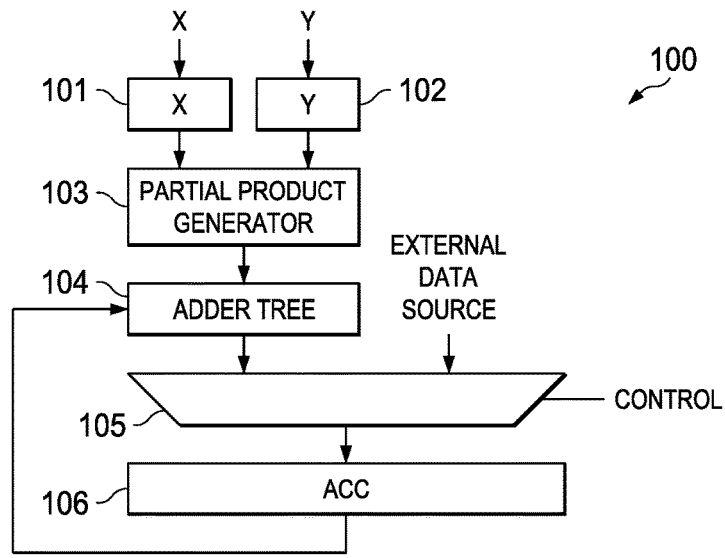
FIG. 1
(PRIOR ART)
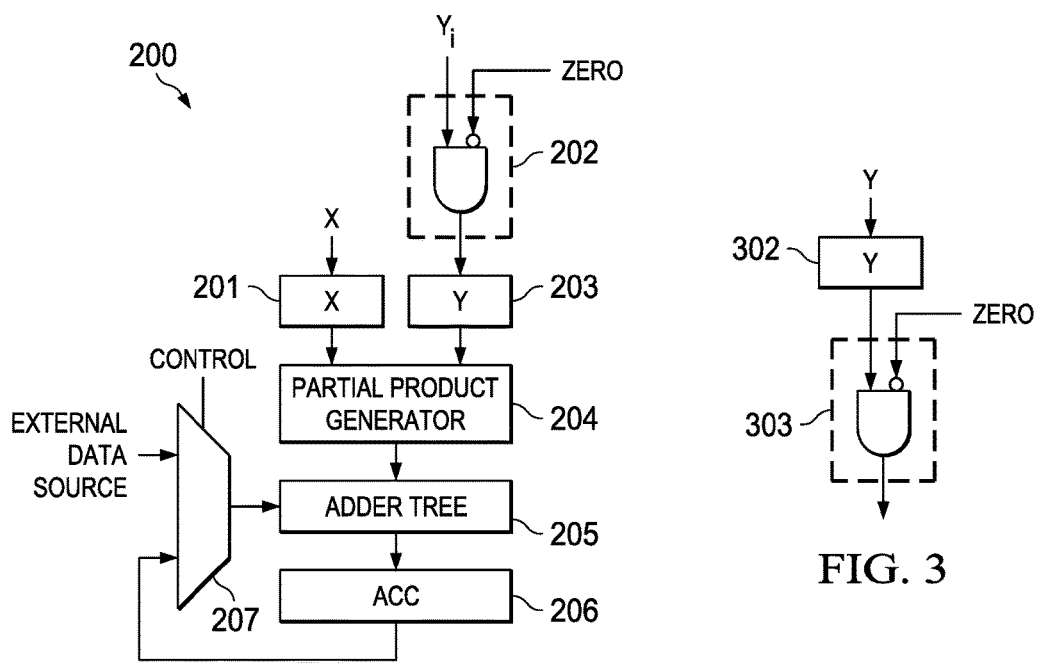
FIG. 2
FIG. 3

US 10,146,506 B2

EFFICIENT IMPLEMENTATION OF A MULTIPLIER/ACCUMULATOR WITH LOAD

CLAIM OF PRIORITY

This application claims priority under 35 U.S.C. 119(e)(1) to U.S. Provisional Application No. 62/078,166 filed Nov. 11, 2014.

TECHNICAL FIELD OF THE INVENTION

The technical field of this invention is multiply-accumulators.

BACKGROUND OF THE INVENTION

A digital signal processor (DSP) instruction set typically include multiply-accumulate instructions which execute in dedicated hardware. This multiply-accumulate hardware implements the function:

$$Acc<=Acc+(X*Y).$$

As defined above the multiply-accumulate instruction forms the product of two operands X and Y and adds their product to the value stored in an accumulator. The sum is stored in the accumulator overwriting the previous value.

It is desirable to have load or move instructions having this accumulation register (Acc) as a destination. Implementing this function typically employs a multiplexer between data from the multiply-accumulate result and the load/move data. The prior art places this multiplexer just before the Acc register. This places the multiplexer on the most critical path. This critical path is the data flow from the X/Y source registers, through the multiply and add operations to the Acc register.

The multiplexer placement creates a problem. By being in the critical path, the multiplexer slows operation of the multiply-accumulate function. The prior art placement of the multiplexer causes all operations to slow, even ordinary multiply-accumulation. This limits the clock rate that can be employed potentially slowing all data processor operation.

SUMMARY OF THE INVENTION

This invention is directed to a multiply-accumulate circuit supporting a load of an accumulator. During multiply-accumulate operation, a partial product generator forms partial produces from the product inputs. An adder tree sums the partial product and the accumulator value. The sum is stored back in the accumulator overwriting the prior value.

During load operation an input gate forces one of the product inputs to all 0's. Thus the partial product generator generates partial products corresponding to a zero product. The adder tree adds this zero product to the external load value. The sum, which corresponds to the external load value is stored back in the accumulator overwriting the prior value.

A multiplexer at the side input of the adder tree selects the accumulator value for normal operation or the external load value for load operation. This placement of the multiplexer is out of the critical path during normal operation. Thus this circuit may operate faster than the prior art that includes the multiplexer between the adder tree and the accumulator.

BRIEF DESCRIPTION OF THE DRAWINGS

These and other aspects of this invention are illustrated in the drawings, in which:

FIG. 1 illustrates a multiply-accumulator having a load accumulator operation with the prior art multiplexer placement;

FIG. 2 illustrates the multiply-accumulator according to this invention; and

FIG. 3 illustrates an alternate input according to this invention.

DETAILED DESCRIPTION OF PREFERRED EMBODIMENTS

FIG. 1 illustrates a multiply-accumulator 100 having a load accumulator operation according to the prior art. Multiply-accumulator 100 includes input register 101 which receives and stores a first input operand X. Multiply-accumulator 100 includes input register 102 which receives and stores a second input operand Y. The sources of X and Y could be data from registers in a register file, data recalled from memory or external inputs. The sources of X and Y are not relevant to this invention.

In accordance with the prior art the multiply-accumulate operation is performed in hardware by the combination of partial product generator 103 and adder tree 104. The data stored in input register 101 and input register 102 are supplied to respective inputs of partial product generator 103. Partial product generator 103 generates a set of partial products from the inputs X and Y. Adder tree 104 sums these partial products with the proper shifts to form the product. Adder tree 104 also receives the current data stored in accumulator 106. Adder tree 104 adds the current data from accumulator 106 to the product data by summing the accumulator data with the partial products.

The accumulated product output of adder tree 104 supplies one input of multiplexer 105. A second input of multiplexer 105 receives external source data. This external source data is used to initialize or load accumulator 106. The control input to multiplexer 105 determines the data selected. During ordinary multiply-accumulate operations, multiplexer 105 selects data from adder tree 104 for storage in accumulator 106. During load operations, multiplexer 105 selects data from the external source for storage in accumulator 106. The selected output of multiplexer 105 is stored in accumulator 106 overwriting any prior data.

The placement of multiplexer 105 illustrated in FIG. 1 creates a problem. Multiplexer 105 introduces additional gate delay in the critical path. Note that every operation of multiply-accumulator 100 involves the gate delay of multiplexer 105. Multiply-accumulator 100 must be clocked at a lower frequency to accommodate this additional gate delay relative to a non-load multiply-accumulator. This limits the clock rate that can be employed potentially slowing all data processor operation.

FIG. 2 illustrates multiply-accumulator 200 according to this invention. During multiply-accumulate operation multiply-accumulator 200 operates in the same manner as multiply-accumulator 100. Multiply-accumulator 200 includes input register 201 which receives and stores a first input operand X and input register 203 which receives and stores a second input operand Y. The data stored in input register 201 and input register 203 are supplied to respective inputs of partial product generator 204. Adder tree 205 sums the partial products with the proper shifts to form the product. Adder tree 205 also receives the current data stored in accumulator 206 (via multiplexer 207 further described below). Adder tree 205 adds the current data from accumulator 206 to the product data by summing the accumulator data with the partial products. The output of adder tree 201 is stored in accumulator 206 overwriting any prior data.

A load operation employs AND gate 202 and multiplexer 207. AND gate 202 includes the same structure for each bit of the second operand Y. A first input of AND gate 202 receives the operand $Y_i$. A second inverting input of AND gate 202 receives a control signal ZERO. During normal (multiply-accumulate) operation control signal ZERO is all 0's. Due to the inverting action of the inverting input, all bits $Y_i$ are passed unchanged to be stored in input register 203. During load operation control signal ZERO is all 1's. Thus all bits of operand Y are blocked and the output of AND gate 202 is all 0's. This zero input is stored in input register 203 and then passed to partial product generator 204. The resulting partial products resolve all 0's. This all zero set of partial products is supplied to adder tree 204.

Multiplexer 207 selects the second input to adder tree 205 as specified by the control input. During multiply-accumulate operation multiplexer 207 selects the current contents of accumulator 206. During load operation multiplexer 207 selects the external data source. Because the output of partial product generator 204 is always zero due to AND gate 202 zeroing one of its inputs during load operations, the sum of adder tree 205 is the external data. Adder tree 205 supplies this external data to accumulator 206 for storage.

This invention puts the multiplexer in the path from the accumulator register to the adder. This path is less critical than the path from the X/Y registers. The data from accumulator 206 can be fed into adder tree 205 at a later point than the partial products from partial product generator 204. AND gate 202 forces the partial products to zero, so that adder tree 205 passes the external data to accumulator register 206. This removes the multiplexer gate delay from the critical path in the multiplier-accumulator. Accordingly, the DSP is permitted to operate at a higher clock frequency.

FIG. 3 illustrates an alternative embodiment of this invention. In FIG. 3 AND gate 303 is disposed between input register 302 and partial product generator 204 rather than between the source of Y and input register 203 as illustrated in FIG. 2. The circuit of FIG. 3 operates as previously described. This circuit passed either operand Y or all 0's to the corresponding input of partial product generator 204.

Those skilled in the art would realize that the AND gate need not be in the second operand path. This circuit would operate equally well with the AND gate in either operand path. Those skilled in the art would realize the recited inverting input to the AND gate depends upon the sense of the control signal ZERO. It is feasible to employ a non-inverting input to the AND gate if control signal ZERO was all 1's for multiply-accumulate operation and all 0's for load operation.

What is claimed is:

1. A multiply-accumulate circuit comprising:
   bit-wise AND gate logic to receive an input operand having a plurality of bits, wherein the bit-wise AND gate logic includes a plurality of AND gates, each AND gate corresponding to a respective bit of the input operand and having a first input to receive the respective bit, a second input to receive a first control signal, and an output, wherein the outputs of the plurality of AND gates collectively form an output of the bit-wise AND gate logic;
   a partial product generator having a first input to receive, as a first operand, the output of the bit-wise AND gate logic, a second input to receive a second operand, and an output to output a partial product produced by the partial product generator based on the first and second operands;
   an adder tree having a first input to receive, as a third operand, the partial product supplied at the output of the partial product generator, a second input to receive a fourth operand, and an output to output a sum produced by the adder tree based on the third and fourth operands;
   an accumulator having an input and an output, wherein the accumulator is configured to store data received at the input and to output the stored data at the output, and wherein the input of the accumulator is coupled to the output of the adder tree, wherein the output of the accumulator is not coupled to the bit-wise AND gate logic; and
   a multiplexer having a first input to receive the output of the accumulator, a second input to receive external data, and an output, wherein the multiplexer is responsive to a second control signal to output a selected one of the first input or the second input at the output, wherein the output of the multiplexer is coupled to the second input of the adder tree and is supplied thereto as the fourth operand;
   wherein, when the multiply-accumulate circuit operates in a multiply-accumulate operation mode, the first control signal causes the bit-wise AND gate logic to pass each bit of the input operand unchanged, and the second control signal causes the multiplexer to output the first input as the fourth operand; and
   wherein, when the multiply-accumulate circuit operates in a load operation mode, the first control signal causes the bit-wise AND gate logic to pass a logic 0 for each bit of the input operand, the second control signal causes the multiplexer to output the second input as the fourth operand, and the sum produced by the adder tree is equal to the fourth operand and is loaded into the accumulator.

2. The multiply-accumulate circuit of claim 1, wherein passing a logic 0 for each bit of the input operand when the multiply-accumulate circuit operates in the load operation mode causes a zero partial product to be formed at the output of the partial product generator.

3. The multiply-accumulate circuit of claim 1, wherein the second input of each AND gate of the bit-wise AND gate logic is an inverting input, and the first control signal has a logic 0 state when the multiply-accumulate circuit operates in the multiply-accumulate operation mode and has a logic 1 state when the multiply-accumulate circuit operates in the load operation mode.

4. The multiply-accumulate circuit of claim 1, further comprising:
   a first input register having an input to receive and store the output of the bit-wise AND gate logic and an output to supply the output of the bit-wise AND gate logic to the first input of the partial product generator as the first operand; and
   a second input register having an input to receive and store data and an output to supply the data stored therein to the second input of the partial product generator as the second operand.

5. The multiply-accumulate circuit of claim 1, further comprising:
   a first input register having an input to receive and store data and an output to supply the data stored therein to the bit-wise AND gate logic; and a second input register having an input to receive and store data and an output to supply the data stored therein to the second input of the partial product generator as the second operand.

6. The multiply-accumulate circuit of claim 1, wherein, due to the output of the accumulator not being coupled to the bit-wise AND gate logic, the output of the accumulator is not selectable as either the first or second operand of the partial product generator.

7. A data processing system comprising:
a processor comprising:
a multiply-accumulate circuit comprising:
bit-wise AND gate logic to receive an input operand having a plurality of bits, wherein the bit-wise AND gate logic includes a plurality of AND gates, each AND gate corresponding to a respective bit of the input operand and having a first input to receive the respective bit, a second input to receive a first control signal, and an output, wherein the outputs of the plurality of AND gates collectively form an output of the bit-wise AND gate logic;
a partial product generator having a first input to receive, as a first operand, the output of the bit-wise AND gate logic, a second input to receive a second operand, and an output to output a partial product produced by the partial product generator based on the first and second operands;
an adder tree having a first input to receive, as a third operand, the partial product supplied at the output of the partial product generator, a second input to receive a fourth operand, and an output to output a sum produced by the adder tree based on the third and fourth operands;
an accumulator having an input and an output, wherein the accumulator is configured to store data received at the input and to output the stored data at the output, and wherein the input of the accumulator is coupled to the output of the adder tree, wherein the output of the accumulator is not coupled to the bit-wise AND gate logic; and
a multiplexer having a first input to receive the output of the accumulator, a second input to receive external data, and an output, wherein the multiplexer is responsive to a second control signal to output a selected one of the first input or the second input at the output, wherein the output of the multiplexer is coupled to the second input of the adder tree and is supplied thereto as the fourth operand;
wherein, when the multiply-accumulate circuit operates in a multiply-accumulate operation mode, the first control signal causes the bit-wise AND gate logic to pass each bit of the input operand unchanged, and the second control signal causes the multiplexer to output the first input; and
wherein, when the multiply-accumulate circuit operates in a load operation mode, the first control signal causes the bit-wise AND gate logic to pass a logic 0 for each bit of the input operand, and the second control signal causes the multiplexer to output the second input as the fourth operand, and the sum produced by the adder tree is equal to the fourth operand and is loaded into the accumulator.

8. The data processing system of claim 7, wherein passing a logic 0 for each bit of the input operand when the multiply-accumulate circuit operates in the load operation mode causes a zero partial product to be formed at the output of the partial product generator.

9. The data processing system of claim 7, wherein the second input of each AND gate of the bit-wise AND gate logic is an inverting input, and the first control signal has a logic 0 state when the multiply-accumulate circuit operates in the multiply-accumulate operation mode and has a logic 1 state when the multiply-accumulate circuit operates in the load operation mode.

10. The data processing system of claim 7, further comprising:
a first input register having an input to receive and store the output of the bit-wise AND gate logic and an output to supply the output of the bit-wise AND gate logic to the first input of the partial product generator as the first operand; and
a second input register having an input to receive and store data and an output to supply the data stored therein to the second input of the partial product generator as the second operand.

11. The data processing system of claim 7, further comprising:
a first input register having an input to receive and store data and an output to supply the data stored therein to the bit-wise AND gate logic; and
a second input register having an input to receive and store data and an output to supply the data stored therein to the second input of the partial product generator as the second operand.

12. The data processing system of claim 7, wherein, due to the output of the accumulator not being coupled to the bit-wise AND gate logic, the output of the accumulator is not selectable as either the first or second operand of the partial product generator.

13. The data processing system of claim 7, wherein the processor comprises a digital signal processor.

* * * * *